R. B. CREASY.
SAW FILING AND GUMMING MACHINE.
APPLICATION FILED JUNE 29, 1911.
1,054,908.
Patented Mar. 4, 1913.
2 SHEETS—SHEET 2.
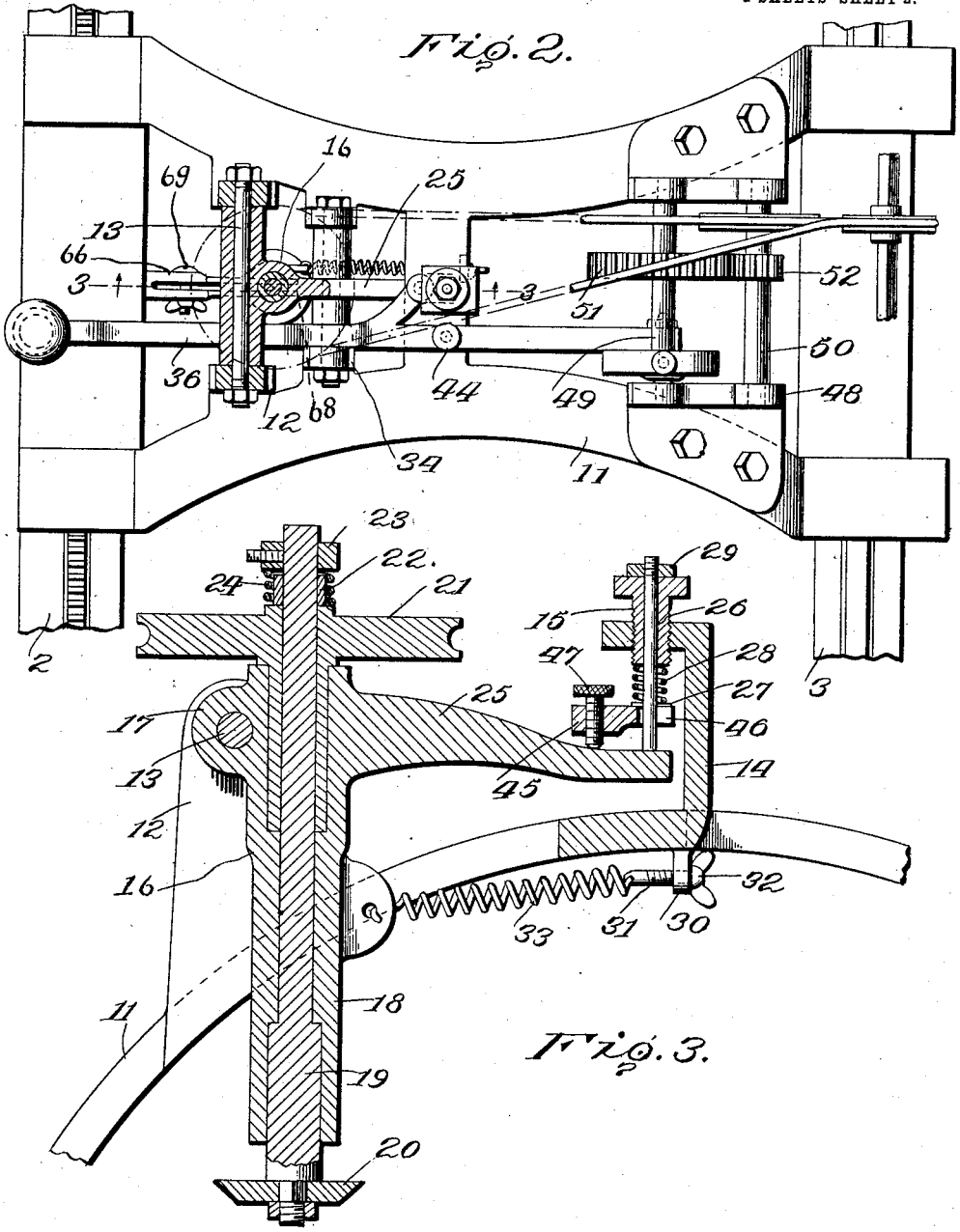
Witnesses
Inventor
R. B. Creasy
By
Attorneys

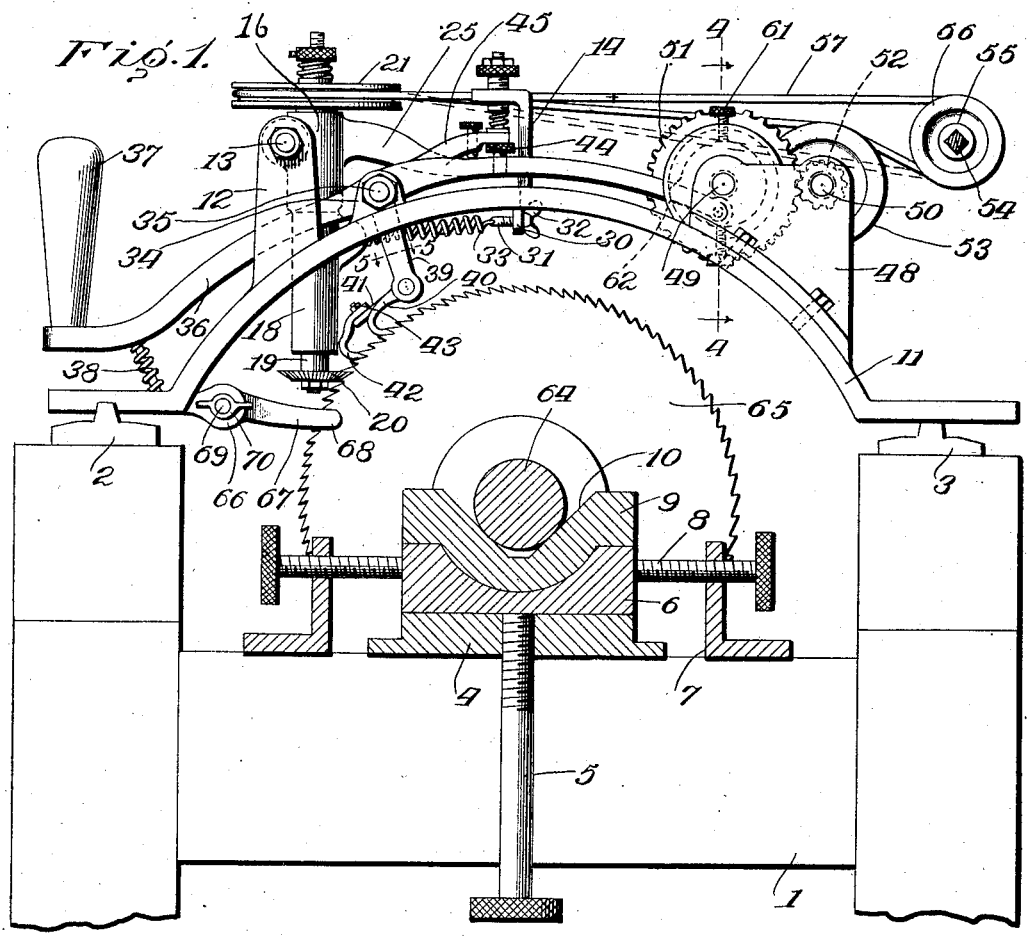
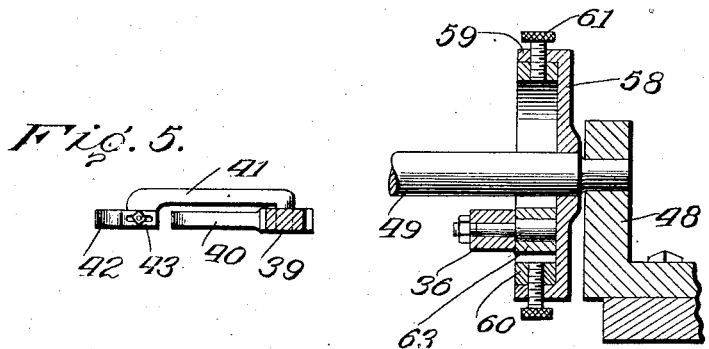

UNITED STATES PATENT OFFICE.

REUBEN B. CREASY, OF BALLINGER, TEXAS.

SAW FILING AND GUMMING MACHINE.

1,054,908. Specification of Letters Patent. Patented Mar. 4, 1913.

Application filed June 29, 1911. Serial No. 636,051.

*To all whom it may concern:*

Be it known that I, REUBEN B. CREASY, a citizen of the United States, residing at Ballinger, in the county of Runnels and State of Texas, have invented certain new and useful Improvements in Saw Filing and Gumming Machines, of which the following is a specification.

This invention has relation to filing and gumming machines for saws adapted to be used in gins and delinters, and has for its object, first, to provide means adapted to be operated automatically or by hand for moving the saws with relation to the file and for moving the file with relation to the saws to accomplish the sharpening and gumming operation.

Another object of the invention is to provide, in combination with a machine, means for supporting a gang of saws so that their teeth may be presented at any desired angle to the sharpening file.

A further object of the invention is to provide, in a machine of the character stated, holding pawls adapted to engage the teeth of the saws and serve as means for rotating the saws prior to the sharpening operation and as means for holding the saws during the sharpening operation. These pawls are two in number and have a peculiar relation as will be explained hereinafter.

A further object of the invention is to provide a movable frame for the file which is operatively connected with the means for operating the holding pawls and which is so mounted that it may be moved independently of the holding pawls.

A further object of the invention is to provide, in a machine of the character indicated, means whereby each tooth of the saw may be filed to any desired extent and each tooth may be operated upon irrespective of its position upon the rim of the saw, that is to say the teeth may be in circular alinement or they may be out of circular alinement, but the sharpening and gumming operation may be accomplished irrespective of such alinement.

A further object of the invention is to provide, in a machine of the character indicated, an adjustable means for regulating the depth at which the file will operate upon the teeth within the edge of the saw and at the same time to provide means for permitting the said file to operate at extraordinary distances within the rim of the saw under variable or extraordinary circumstances.

A further object of the invention is to so assemble and arrange the parts that the extent of cut of the file in the throat between the teeth of the saws may be regulated and directed as occasion or circumstances may require.

In the accompanying drawings:—Figure 1 is a side elevation of the machine with parts in section; Fig. 2 is a top plan view of a portion of the machine; Fig. 3 is a vertical sectional view of a portion of the machine cut on the line 3—3 of Fig. 2; Fig. 4 is a transverse sectional view of a portion of the machine cut on the line 4—4 of Fig. 1. Fig. 5 is a detail plan view of pawls used upon the machine.

Corresponding and like parts are referred to in the following description and indicated in all the views of the accompanying drawings by the same reference characters.

The machine includes a frame 1 which is preferably a structure of wood having at its top and in the vicinity of its front and rear edges rails 2 and 3 respectively which extend longitudinally of the said frame. The rail 3 is provided with a smooth upper bearing surface while the rail 2 is provided at its upper portion with a series of teeth adapted to receive between them part of a carriage to be explained hereinafter, whereby the said carriage is held in an adjusted position upon the said rails. Plates 4 (of which one only is shown) are mounted upon the intermediate end portions of the frame 1 and adjusting screws 5 are threaded through the said plates. Blocks 6 are mounted upon the upper surfaces of the plates 4 and the upper ends of the said screws 5 bear directly against the lower surfaces of the said blocks. Therefore it will be seen that by turning the screw 5 the blocks 6 may be raised or lowered with relation to the plate 4. Lugs 7 are mounted upon the end portions of the frame 1 at the opposite sides of the plate 4 and carry adjusting screws 8 which bear at their inner ends against the opposite sides of the block 6. Therefore it will be seen that by turning the screws 8 the block 6 may be adjusted horizontally over the plate 4. A bearing 9 is carried by each block 6 and is provided at its upper side with a recess 10.

A carriage 11 is mounted upon the rails 2 and 3 and bridges the intermediate portion of the frame 1. At its forward portion the said carriage is adapted to engage the teeth of the rail 2, as indicated in Fig. 1 of the drawing, whereby the said carriage is held in an adjusted position along the said rails. In edge elevation the carriage 11 is arched at its intermediate portion. Upstanding brackets 12 are located at the side edges of the forward portion of the carriage 11 and carry a cross pin 13. A bracket 14 is mounted upon the intermediate portion of the carriage 11 and a sleeve 15 is screw threaded therein for vertical adjustment. A filer frame 16 is pivotally mounted upon the cross pin 13 and includes a sleeve portion 17 which loosely receives the said pin and which bears at its ends against the brackets 12 at the opposite sides of the carriage 11. The said filer frame also includes a sleeve portion 18 which is joined with the sleeve portion 17 and is disposed at a right angle thereto. A spindle 19 is journaled in the sleeve portion 18 and at its lower end carries a circular file 20. This file is provided with a beveled periphery, as illustrated in Figs. 1 and 3 of the drawings. A pulley 21 is fixed to the spindle 19 above the upper end of the sleeve portion 18 and a collar 22 is mounted upon the upper portion of the spindle 19 above the said pulley 21. An abutment 23 is adjustably fixed to the upper portion of the spindle 19 above the collar 22 and a coil spring 24 is interposed between the upper surface of the pulley 21 and the said abutment 23 and is under tension with a tendency to hold the spindle 19 in elevated position within the sleeve portion 18. The filer frame 16 also includes an arm 25 which extends toward the bracket 14. A rod 26 is slidably mounted in the sleeve 15 and at its lower end bears against the upper surface of the free end portion of the arm 25. An abutment 27 is fixed to the intermediate portion of the rod 26 and a coil spring 28 is interposed between the said abutment and the lower end of the sleeve 15 and is under tension with a tendency to hold the said rod in lowered position in the said sleeve. A nut 29 is adjustably mounted upon the upper end portion of the rod 26 and is adapted to engage the upper end of the sleeve 15, whereby the downward movement of the rod 26 within the said sleeve is limited. A lug 30 is located at the intermediate portion of the carriage 11 and a bolt 31 passes through the same. A nut 32 is screw threaded upon the end of the bolt 31 and at its inner face bears against the side of the lug 30. A coil spring 33 is connected at one end with the bolt 31 and at its other end with the intermediate portion of the sleeve portion 18 of the filer frame 16. Therefore it will be seen that by turning the nut 32 the bolt 31 may be moved longitudinally within the lug 30, whereby the tension of the spring 33 may be increased or diminished as desired.

Lugs 34 are formed at the side edges of the intermediate portion of the carriage 11 at points behind the standards 12 and carry a cross pin 35. A lever 36 is fulcrumed upon the cross pin 35 and its power end portion extends toward the front edge of the carriage 11 and is provided with an upstanding handle 37. A spring 38 is interposed between the forward end portion of the carriage 11 and the power end portion of the lever 36 and is under tension with a tendency to hold the said power end portion of the said lever elevated and away from the carriage 11. A downwardly extending arm 39 is fixed to the lever 36 in the vicinity of its fulcrum point and a pawl 40 is fixed to the lower end of the arm 39. A finger 41 is pivoted to the lower end of the arm 39 and carries a pawl 42 which may be adjusted longitudinally with relation to the said finger and secured in an adjusted position. This adjustment and securing of the pawl 42 is accomplished by means of a bolt and slot connection indicated at 43 and which is of the usual pattern. A screw 44 is threaded through the intermediate portion of the lever 36 and is adapted to engage the intermediate portion of the carriage 11, whereby the swinging movement of the said lever may be limited, and by adjusting the said screw in the lever the extent of the swinging movement of the said lever may be increased or diminished as desired. An arm 45 is also carried by the lever 36 and has a free end portion disposed over the arm 25 and provided with a slot 46 which receives the lower portion of the rod 26 and which is located below the abutment 27 carried by the said rod. A screw 47 is threaded through the free end portion of the arm 45 and is adapted to engage the free end portion of the arm 25 in a manner so that the arm 25 will be depressed at the same time that the arm 45 is so moved, but the arm 45 may have a certain amount of vertical movement against the tension of the spring 28 independently of the vertical movement of the free end portion of the arm 25. The object of this will be explained hereinafter.

Upstanding brackets 48 are mounted at the edges of the rear portion of the carriage 11 and shafts 49 and 50 are journaled in the said brackets. The shaft 49 carries a relatively large gear wheel 51 and the shaft 50 carries a relatively small gear wheel 52. These gear wheels mesh one with the other. A pulley 53 is fixed to the shaft 50. A shaft 54 is journaled for rotation over the rear portion of the carriage 11 and approximately vertically over the rear rail 3 thereof. This shaft is preferably non-circular in transverse section. A sleeve 55 snugly receives the shaft 54 and may slide longitudinally thereof. The sleeve 55 carries a pulley 56. Any suitable means may be provided for rotating the shaft 54. An endless belt 57 is trained around the pulleys 21 and 56 and at times its lower run may be brought in contact with the upper portion of the periphery of the pulley 53. This belt at all times is adapted to transmit rotary movement from the shaft 54 to the spindle 19, and at such times when the lower run of the said belt is in contact with the upper portion of the periphery of the pulley 53, as indicated in Fig. 1, rotary movement is transmitted from the shaft 54 to the shaft 50 and through the intermeshing gear wheels 51 and 52 to the shaft 49.

A disk 58 is mounted upon the shaft 49 and carries an inturned annular flange 59. A cam ring 60 is received within the flange 59 and is detachably held therein by means of screws 61, whereby a cam ring of one pattern may be removed from the flange 59 and a similar ring of another pattern may be substituted in its stead.

As indicated in Fig. 1 of the drawing this ring is provided with a depression 62 the deep portion of which extends away from the center of the disk 58.

A roller 63 is journaled at the working end portion of the lever 36 and extends toward the disk 58 and is received within the ring 60 and normally bears against the inner surface thereof.

The shaft of a gang of saws to be sharpened is indicated at 64 located in the recess 10 of the bearing 9 and the saw which is shown in Fig. 1 as being operated upon is indicated at 65. Spaced lugs 66 are formed at the forward portion of the carriage 11 and carry between them a guide 67. The said guide 67 is provided at its free end portion with a slot 68 which receives the forward end portion of the saw 65 which is being operated upon. The guide 67 is pivoted upon a bolt 69 which passes transversely through the lugs 66 and which is provided at one end with a wing nut 70 which may be tightened upon the bolt 69, whereby the lugs 66 may be drawn toward each other and the guide 67 clamped in adjusted position between them.

When the parts are positioned as indicated in Fig. 1 of the drawings it will be seen that the saw 65 is held in its proper position by the guide 67 and the pawls 40 and 42. The pawl 42 is made adjustable with relation to the fixed pawl 40 in order that the said pawls may be spaced a sufficient distance apart to engage two of the teeth of the saw, irrespective of the length of the teeth of the particular saw being operated upon. Also two pawls, as indicated, are provided for the reason that in operating upon a saw one or more of the teeth of the saw may be broken off and consequently there is unoccupied space at the periphery of the saw. By having the two pawls this space may be bridged and there is at all times one tooth of the saw engaged by at least one pawl. The object in having one of the pawls, as for instance the pawl 40, fixed with relation to the arm 39 and the other pawl, as for instance the pawl 42, pivoted with relation to the arm 39 is that one of the said pawls will be positively moved away from the periphery of the saw when the arm 39 is swung, while the other pawl may slide along the edge of the tooth of the saw when the arm 39 is swung so that it will promptly engage the under edge of the tooth when the arm 39 is swung in an opposite direction and insure prompt rotary movement of the saw which is completed when the fixed pawl engages another tooth of the said saw as the inward movement of the arm 39 is completed.

The tension of the spring 33 is such that it holds the arm 25 at all times in contact with the lower end of the screw 47 carried by the arm 45. Therefore when the arm 45 is depressed under the influence of the springs 28 and 38 at the time that the roller 63 enters the depression 62 of the ring 60, the file is moved away from the teeth of the saw and the pawls are moved along the teeth of the saw. The tension of the spring 33 is not sufficient to overcome the combined tensions of the springs 28 and 38 and consequently the movement of the lower end of the portion 18 and the file 20 is limited by the movement of the lever 36 which in turn is controlled in its movement by the springs 28 and 38.

The shallow portion of the cam ring 60 when it engages the roller 63 carried at the working end of the lever 36 has a tendency to lift the working end of the said lever against the tension of the springs 28 and 38. Therefore the tension of the spring 33 comes into play and the file 20 is moved toward the periphery of the saw 65. Therefore when the working end portion of the lever 36 is operated by the cam ring 60 carried by the disk 58 and its flange 59 the rotation of the saw 65 will be accomplished by the pawls 40 and 42 at uniform and regular stages, while the sharpening and gumming of the teeth and throats will be accomplished by the file 20 at uniform depths and at regular intervals. At any time during this operation, however, an operator may depress the power end portion of the lever 36 against the tension of the spring 38, whereby the free end of the arm 45 is lifted against the tension of the spring 28 and the spring 33 will cause the file 20 to cut deeper into the periphery of the saw 65. This is necessary sometimes when a tooth is broken off near its point or is missing entirely from the periphery of the saw and it is desired to cut a short tooth in the saw or to cut an entire new tooth therein. As soon as this irregular tooth has been passed the operator may permit the machine to automatically operate in filing and gumming the remaining teeth which are left in regular relation.

The extent of the arcuate movement of the file 20 is greater than the extent of the arcuate movement of the fixed pawl 40 and the lower end of the arm 39. Consequently when the parts are moved away from the saw the file 20 will disengage the saw prior to the pawls carried by the arm 39 and the said pawls will be the first to engage the saw when the parts are moved toward the same. Therefore the saw is turned and positioned before the file enters the throat between the teeth and begins its sharpening and gumming operation. The file 20 will cut shallow or deep into the periphery of the saw according to the transverse thickness of the cam ring 60, also the movement of the file 20 away from the periphery of the saw may be governed by adjusting the screw 44 in the lever 36 with relation to the carriage 11. The movement of the pawls 40 and 42 is also governed by this adjustment. The movement of the lever 36 and filer frame with relation to each other is governed and varied by adjusting the screw 47 in the arm 45 with relation to the arm 25 carried by the said filer frame.

Therefore it will be seen that a saw filing and gumming machine is provided which may be automatic in its action throughout or hand operated throughout, or these operations may be combined so that the machine will operate automatically under normal conditions and may be operated by hand at any time under abnormal conditions.

Having thus described the invention, what is claimed as new is:

1. A machine of the character indicated comprising a carriage, a filer frame pivotally mounted upon the carriage, a file journaled for rotation thereon, power driven means for rotating the file, means for resiliently holding the file toward its work, means for moving the filer frame from its work, and a yieldable stop in the path of the movement of the filer frame toward its work.

2. A machine of the character indicated comprising a carriage, a filer frame pivotally mounted thereon, a file carried by said frame, means for resiliently holding the file toward its work, a lever fulcrumed upon the carriage and engaging the filer frame, means for automatically swinging the lever to permit the filer frame to have a normal prescribed pivotal movement, and a yieldable stop in the path of movement of the filer frame having a slidable engagement with the lever whereby an excessive movement of the filer frame may be permitted.

3. A machine of the character indicated comprising a carriage, a filer frame pivotally mounted thereon, a file carried by said frame, means for resiliently holding the file toward its work, a flanged disk journaled upon the frame, means for rotating said disk, a cam ring detachably mounted in said disk, a lever fulcrumed upon the carriage and having an end fitting in and engaging the cam ring, and an arm projecting laterally from the lever and engaging the filer frame.

4. A machine of the character indicated comprising a carriage, a filer frame pivoted thereon and having an arm, a file carried by the filer frame, resilient means for holding the file toward its work, a sleeve adjustably mounted upon the carriage, a rod slidably passing through the sleeve and engaging the arm of the frame, means for limiting the sliding movement of said rod, an abutment carried by the rod, a spring interposed between the sleeve and the abutment, a lever fulcrumed upon the carriage, saw positioning means carried by the lever, said lever having an arm the extremity of which is located below the said abutment and is engaged by the same, adjustable means operatively connecting the arm of the lever with the arm of the filing frame, and means for limiting the swinging movement of the lever with relation to the carriage, said lever being operable to move the file away from its work.

In testimony whereof, I affix my signature in presence of two witnesses.

REUBEN B. CREASY. [L. S.]

Witnesses:
R. G. ERWIN,
A. J. THORP.

---

Copies of this patent may be obtained for five cents each, by addressing the "Commissioner of Patents, Washington, D. C."